United States Patent [19]

Pinkham

[11] 4,102,723
[45] Jul. 25, 1978

[54] METHOD FOR FORMING A TIRE CARCASS HAVING AN OPENING

[75] Inventor: Herbert G. Pinkham, Minonk, Ill.

[73] Assignee: Caterpillar Tractor Co., Peoria, Ill.

[21] Appl. No.: 789,478

[22] Filed: Apr. 21, 1977

[51] Int. Cl.² ............................................. B29H 15/00
[52] U.S. Cl. .................................... 156/120; 152/430; 152/DIG. 11; 156/121; 156/123 R; 156/514
[58] Field of Search ............ 156/69, 110 R, 118–121, 156/123 R, 172, 191, 194, 213, 261, 262, 293, 294, 298, 303.1, 394 R, 383, 397, 423, 513, 514, 421; 152/427, 429, 430, DIG. 7, DIG. 11, 350

[56] References Cited

U.S. PATENT DOCUMENTS

| | | | |
|---|---|---|---|
| 1,541,119 | 6/1925 | Rusha | 156/120 |
| 2,746,812 | 5/1956 | Eger | 152/429 |
| 3,017,308 | 1/1962 | Pond | 156/120 |
| 3,031,354 | 4/1962 | Williams | 156/120 |
| 3,490,979 | 1/1970 | Calvert et al. | 156/423 |
| 3,776,792 | 12/1973 | Grawey | 156/123 |
| 4,010,052 | 3/1977 | Edwards | 156/120 |

Primary Examiner—John E. Kittle
Attorney, Agent, or Firm—John L. James

[57] ABSTRACT

Method and apparatus for supporting and maintaining tire reinforcing elements relative to an opening of a tire carcass base during forming of a tire carcass.

18 Claims, 11 Drawing Figures

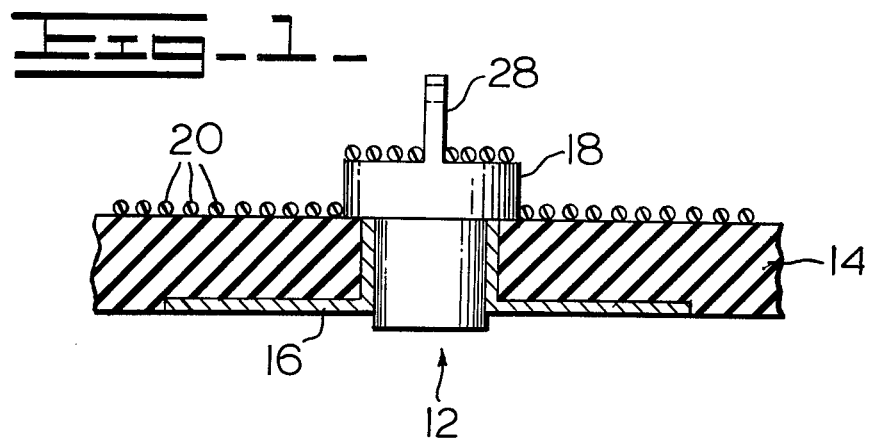
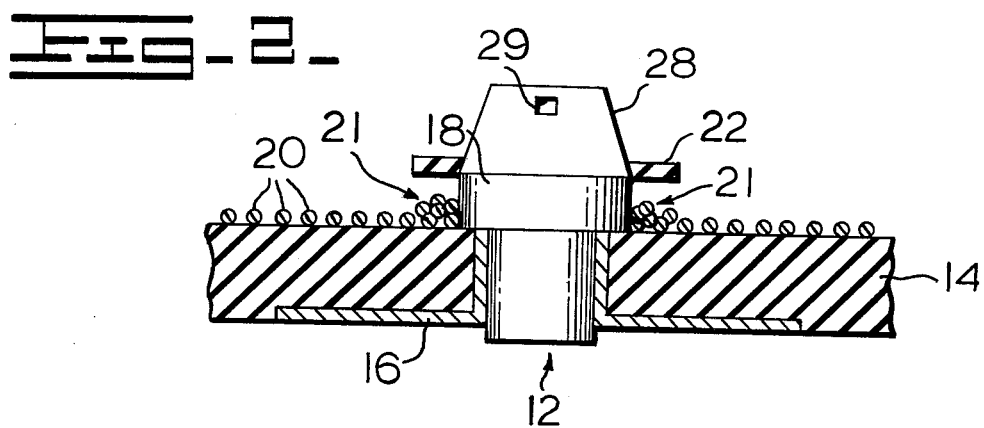
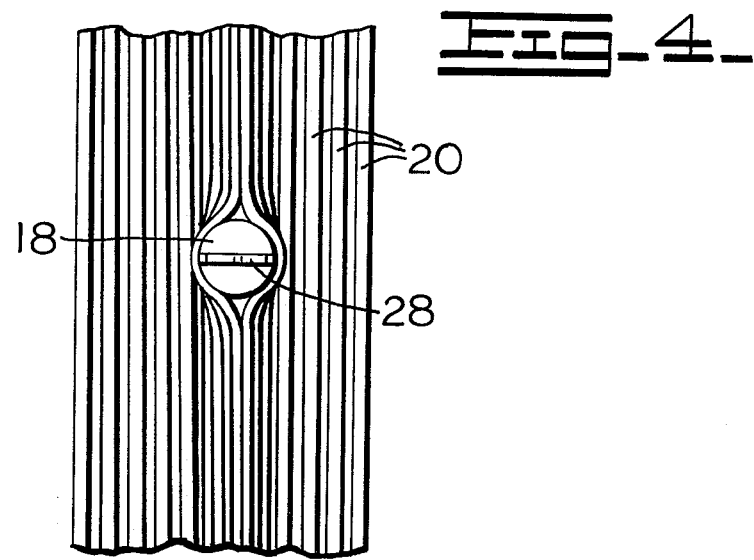

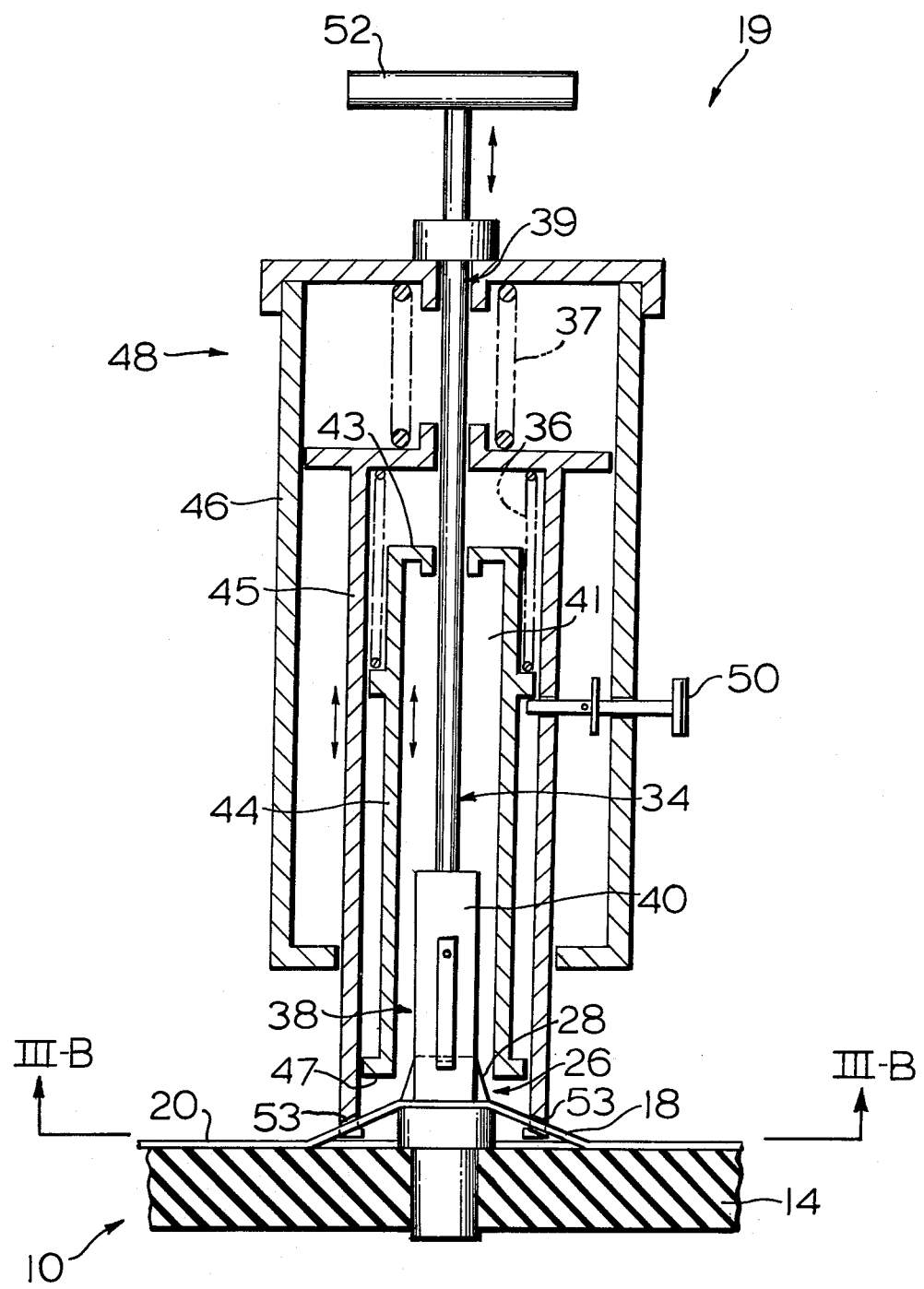

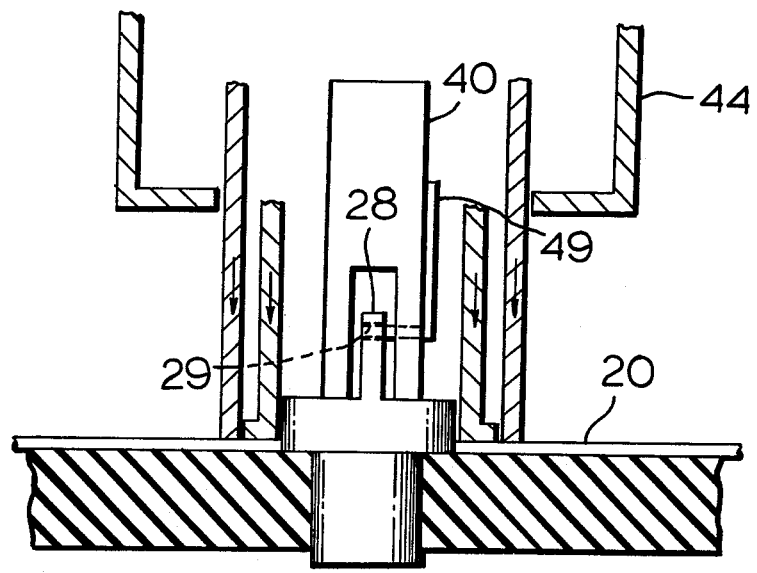
Fig-3A-
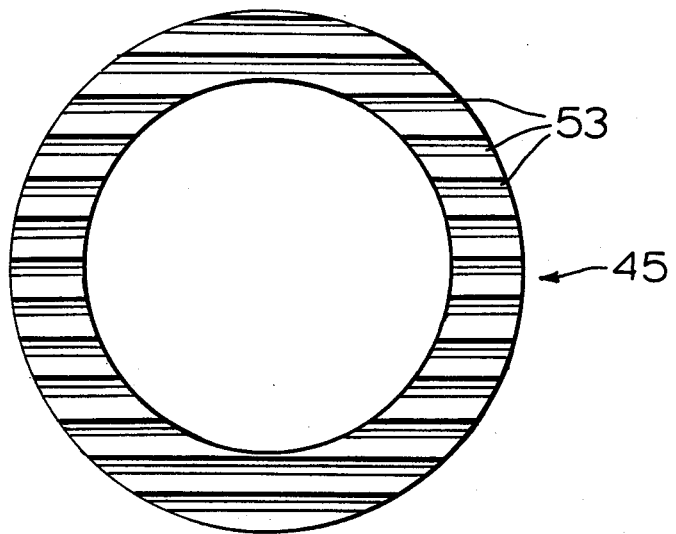
Fig-3B-

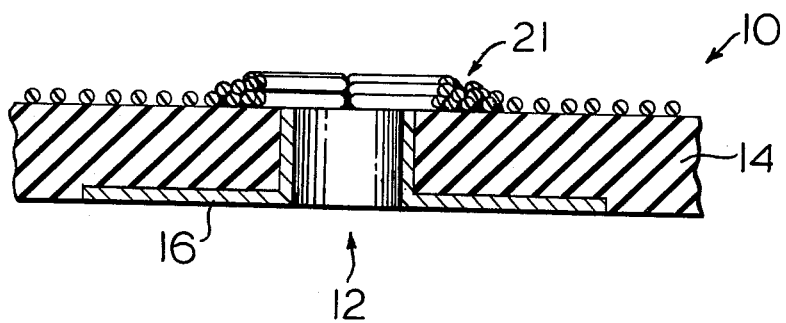
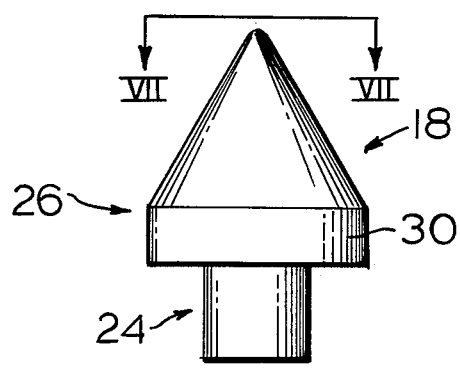
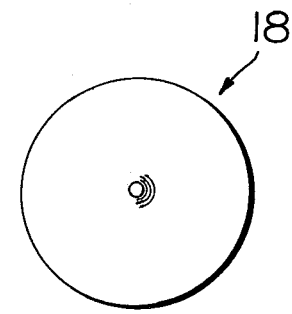
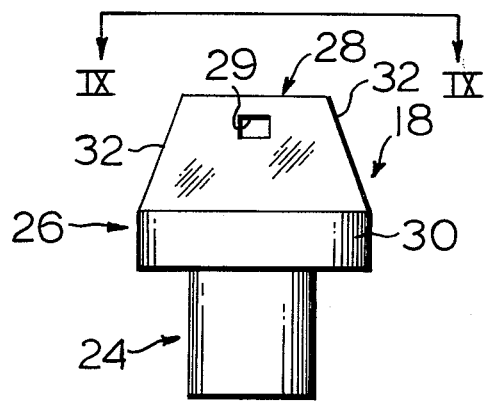
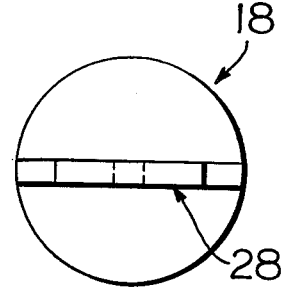

METHOD FOR FORMING A TIRE CARCASS HAVING AN OPENING

BACKGROUND OF THE INVENTION

In the manufacture of a tire carcass, particularly a carcass of a closed-torus tire, a hole or opening was provided in a carcass base, a pilot plug was installed in the opening and reinforcing elements were layed up about the carcass base and outwardly extending pilot plug. The reinforcing elements overlying the pilot plug end were then manually moved clear of the plug end and urged against the carcass base material adjacent the opening involving considerable expenditure of time. This expenditure of time is wasteful, tedious and sometimes results in a waste of material through error.

The present invention is directed to overcoming one or more of the problems as set forth above.

According to the invention a method is provided for forming a tire carcass having a valve opening. Tire forming material is layed up an a tire carcass base having a valve opening is formed. A separating element is inserted into the valve opening. Reinforcing elements are layed up over the carcass base and separating element. The reinforcing elements overlaying the separating element are moved to a position immediately adjacent the separating element and valve opening. The moved reinforcing elements are then fixed adjacent the separating element and the separating element is thereafter removed from the resulting valve opening.

BRIEF DESCRIPTION OF THE DRAWINGS

FIG. 1 is a partial diagrammatic rim wall view in section of the closed-torus tire carcass base having reinforcing elements over the tire carcass base and supporting element;

FIG. 2 is a view similar to FIG. 1 with the reinforcing elements being moved by the separating element;

FIG. 3 and 3A are partial diagrammatic rim wall views in section showing an assembly cooperating with the separating element for moving the reinforcing elements;

FIG. 3B is a diagrammatic view of the end of the second housing;

FIG. 4 is a partial diagrammatic top view of FIG. 2;

FIG. 5 is a partial diagrammatic rim wall view in section of the formed valve opening of the tire carcass.

FIGS. 6 and 7 are diagrammatic views of one embodiment of the separating element.

FIGS. 8 and 9 are diagrammatic views of another embodiment of the separating element.

DETAILED DESCRIPTION OF THE INVENTION

In the method and apparatus of this invention, a closed-torus tire carcass 10 is formed which has a valve opening 12. The valve opening 12 can be formed in the rim wall of the tire, for example. However, it should be understood that the valve opening can be formed at any desirable location on the tire and the invention is particularly adaptable for forming close-torus tires.

Referring to FIG. 1, in the method of this invention, tire forming material, for example rubber, is layed up and a tire carcass base 14 is formed. The tire carcass base 14 has a valve opening 12. A valve plate 16 having an opening can be utilized for defining opening 12 during laying up of the tire forming material which extends over a portion of the valve plate 16.

A separating element 18 is then inserted into the valve opening 12. Thereafter, reinforcing elements 20, for example nylon cords, are layed up over the carcass base 14 and separating element 18. The reinforcing elements 21 overlaying the separating element 18 are moved by the separating element 18 to a position immediately adjacent the separating element 18 and valve opening 12 as seen in FIGS. 2 and 4.

When utilizing a separating element 18 of a construction as shown in FIGS. 6 and 7, the reinforcing elements 21 are moved in response to contact with the separating element 18 during lay up of the reinforcing elements 20. When utilizing a separating element 18 of a construction as shown in FIGS. 8 and 9, the reinforcing elements 21 are moved in response to rotation of the separating element 18.

At the moved position of the reinforcing elements 20, the reinforcing elements 21 are fixed to the tire carcass base 14 immediately adjacent the separating element 18, as shown in FIG. 5. Where the reinforcing elements 21 are wire, for example, said reinforcing elements 21 can be fixed to the tire carcass base 14 by laying up tire forming material 22 over portions of the reinforcing elements 21 immediately adjacent the separating element. In this embodiment, the material 22 is preferably of ring configuration and is pressed against the reinforcing elements 21 with an assembly 19, as hereinafter more fully described. Where the reinforcing elements 21 are organic cord having a tacky polymer coat, for example, the elements 21 can be fixed to the tire carcass base 14 by pressing the cords firmly against base 14 with assembly 19.

After fixing of the reinforcing elements 21, the separating element 18 is removed.

The reinforcing material 20 is preferably substantially continuous metal wire or organic cord that is helically wound over the carcass base 14.

Referring to FIGS. 6-9, the separating element 18 has a first end portion 24 of a first preselected configuration sufficient for inserting into the opening 12 of the tire carcass base 14 and a second end portion 26 of a size sufficient for extending outwardly from the tire carcass base 18 in the installed position shown in FIGS. 1 and 2. The second end portion 26 is of a construction sufficient for urging overlaying reinforcing elements 21 to preselected locations relative to the tire carcass opening 12.

In the preferred embodiment of FIGS. 8 and 9, the second end portion 26 has a flange 28 extending substantially perpendicularly to the first end portion 24. Preferably, the second end portion 26 has an intermediate portion 30 of a round cross sectional configuration. The flange 28 has a length substantially equal to the diameter of the intermediate portion 30. As best seen the edges 32 of the flange 28 taper outwardly in a direction from the intermediate portion 30 toward the outer end of the flange 28.

In the embodiment of FIGS. 6 and 7, the second end portion 26 of the separating element 18 is of a generally conical configuration.

The intermediate portion 30 of either embodiment can be of generally columnar configuration (see FIG. 8) or of a tapered configuration (see FIG. 6). In the tapered configuration, the moved reinforcing elements 21 are urged by the tapered intermediate portion 30 toward the opening 12 while maintaining the opening 12 free from said elements 21.

The assembly 19 for positioning reinforcing elements 20 and forming a tire carcass 10 having an opening, are best shown in FIGS. 3 and 3A. In addition to the previously described separating element 18, the assembly 19 can include a first free sliding means 34 for engaging and rotating the flange 28 with the separating element 18 at the installed position.

The first means 34 can comprise a bifurcated flange holding element 40 having first and second end portions 38, 39. The bifurcated first end portion 38 is of a size sufficient for receiving the flange 28 therein and is rotatably positioned in a chamber 41 of a second means 43.

The second means 43 of assembly 19 has at least one housing 44 having a chamber 41 and a first foot end 47 of annular configuration opening into the chamber 41. The chamber 41 is of a size sufficient for slidably receiving the second end portions of the second separating element 18 within the chamber 41 with the housing walls being in close proximity to the second end portion 26 of the separating element 18. The first foot end 47 of the housing 44 is generally annular and the walls thereof are of dimension sufficient for covering a preselected number of underlying reinforcing elements 20 which have been moved by the separating element 18. Biasing means can be provided for biasing the second means 43 in a direction toward the first end portion 38 of the first means 34. The biasing means can be by hand or can be mechanical.

In the preferred embodiment shown in FIGS. 3 and 3A, there are first, second, and third housings 44, 45, 46. The first housing 44 has the first foot end 47 and is slidably positioned within the second housing 45. The second housing 45 is slidably positioned within the third housing 46. Biasing means 36, 37 are provided for urging respective housings 44, 45 toward and into forcible contact with the reinforcing elements 20 adjacent the separating element 18. Trigger 50 can be associated with the housings 44, 45, 46 for controllably initiating urging of the housings 44, 45 into forcible contact with the reinforcing elements 20 at preselected intervals relative to the rotation of the separating element 18 and in response to forces exerted by biasing means 36, 37.

In the operation of the assembly 19, the housings 44, 45, 46 are positioned over the separating element 18. The first means 34 is urged downwardly by exerting a force or handle 52. During downward movement of the first means 34, the flange 28 is positioned within the bifurcated holding slot 40, the catch spring 49 latches into the flange opening 29, and spring 37 is loaded which exerts a downwardly directed force on housing 45. The lower end of housing 45 has parallel notches 53 (FIG. 3B) which receive responsive overlying reinforcing elements 21 for urging said elements 21 toward the tire base 14 and maintaining said elements 21 against movement.

The handle 52 is thereafter rotated about 90° which causes elements 21 to be moved from over the separating element 18 to a location immediately adjacent the element 18 while maintaining the reinforcing elements 21 on opposed sides of the separating element with the second housing 45. As the reinforcing elements 21 are moved from over the separating element 18, the reinforcing elements 21 are moved into possible contact with the tire base 14 by housing 45 in response to spring 37.

As housing 45 moves downwardly, spring 36 is loaded. Thereafter trigger 50 is released which allows housing 44 to move downwardly and exert annular forces on the reinforcing elements 21 by the foot 47.

The pressure exerted by the foot 47 fixes the reinforcing elements 21 with the tire base 14 about the opening 12.

Thereafter, assembly 19 can be removed which action also pulls separating element 18.

For establishing the opening in the tire carcass base, a valve plate 16 can be provided during initial lay up operation. The valve plate 16 has an opening defining the opening 12 of the tire carcass base 14.

The flange 28 can also have an opening 29. A catch spring 49 can then be associated with the slot 40 for latching into opening 29 for use in retrieving the separating element.

The embodiment of the invention in which an exclusive property or privilege is claimed are defined as follows:

1. A method for forming a tire carcass having a valve opening, comprising:

laying up a first tire forming material and forming a tire carcass base having a valve opening;

inserting a separating element into the valve opening, and positioning an intermediate portion of the separating element adjacent the valve opening and overlaying the first tire forming material;

laying up reinforcing elements on the carcass base and over the intermediate portion of the separating element;

moving the reinforcing elements overlaying the intermediate portion of the separating element to a position immediately adjacent the intermediate portion of the separating element and valve opening and forming the valve opening through the reinforcing elements;

fixing said reinforcing elements immediately adjacent said separating element; and removing the separating element from the resulting valve opening.

2. A method, as set forth in claim 1, wherein the reinforcing elements are moved in response to contacting the separating element during laying up of said reinforcing elements.

3. A method, as set forth in claim 1, including the step of rotating the separating element for moving the reinforcing elements.

4. A method, as set forth in claim 3, wherein the reinforcing elements are a substantially continuous cord and laying up of the cord comprises wrapping the cord about the tire carcass base in a preselected orientation.

5. A method, as set forth in claim 4, wherein the separating element has a flange extending outwardly from the tire carcass base in the installed position in the valve opening and including aligning the flange substantially parallel with the preselected orientation of the subsequently layed up cord.

6. A method, as set forth in claim 1, wherein fixing the reinforcing elements immediately adjacent the separating element includes pressing said reinforcing elements against the tire forming material immediately adjacent the separating element.

7. A method, as set forth in claim 6, including pressing tire forming material of ring configuration over the reinforcing elements immediately adjacent the separating element.

8. A method, as set forth in claim 1, including progessively laying first tire forming material over the reinforcing elements immediately adjacent the separating element.

9. A method, as set forth in claim 1, including laying up first tire forming material over portions of a valve plate having an opening for forming the tire carcass base, said base having the valve opening generally coaxial with the opening of the valve plate.

10. An assembly for positioning reinforcing elements and forming of a tire carcass having an opening comprising:
a separating element having a first end portion of a first preselected configuration sufficient for inserting into an opening of a tire carcass base, a second end portion of a size sufficient for extending outwardly from the tire carcass base in the installed position of the first end portion of the separating element in the opening of the tire carcass base, said second end portion being of a construction sufficient for urging overlaying reinforcing elements to preselected locations along the tire carcass adjacent the tire carcass opening while maintaining the tire carcass opening free from said reinforcing elements, said second end portion of the separating element being of tapered configuration, said second end portion having an end portion and an intermediate portion, said end portion convergingly tapering from the intermediate portion, said intermediate portion being intermediate said end portion and the first end portion of the separating element.

11. An assembly, as set forth in claim 10, wherein the second end portion of the separating element is of a generally conical configuration.

12. An assembly for positioning reinforcing elements and forming a tire carcass having an opening comprising:
a separating element having a first end portion of a first preselected configuration sufficient for inserting into an opening of a tire carcass base, a second end portion of a size sufficient for extending outwardly from the tire carcass base in the installed position of the first end portion of the separating element in the opening of the tire carcass base, said second end portion being of a construction sufficient for urging overlaying reinforcing elements to preselected locations relative to the tire carcass opening, said second end portion having a flange extending substantially perpendicular to the first end portion;
first means for rotating the flange for separating and moving reinforcing elements to a position adjacent the separating element, said first means comprising a flange turning element having first and second end portions, said first end portion being bifurcated and of a size sufficient for receiving the flange therein and being rotatably positioned in the chamber; and
second means comprising a housing having a chamber and a first end opening into the chamber, said chamber being of a size sufficient for slidably receiving the second end portion of the separating element within the chamber with the housing walls being in close proximity to said second end portion, said second end portion extending through the second end portion of the second means.

13. An assembly, as set forth in claim 12, including an intermediate portion positioned between and connected to the flange and the first end portion said intermediate portion being of a round cross sectional configuration and said flange having a base of a length substantially equal to the diameter of the intermediate portion.

14. An assembly, as set forth in claim 13, wherein edges of the flange taper outwardly in a direction from the intermediate portion to the outer end of the flange.

15. An assembly, as set forth in claim 12, wherein the first end of the housing is generally annular and walls thereof are of dimensions sufficient for covering a preselected number of underlying reinforcing elements moved by the separating element.

16. An assembly, as set forth in claim 12, including
a second housing being slidably positioned substantially concentrically about said first housing, said second housing having an end having a plurality of substantially parallel slots.

17. An assembly, as set forth in claim 16, including
means for biasing the second housing in a direction outwardly from the first end opening of the first housing.

18. An assembly, as set forth in claim 16, including
means for controllably releasing and biasing the first housing in a direction outwardly from the assembly.

* * * * *